United States Patent [19]

Shibata

[11] Patent Number: 4,873,715
[45] Date of Patent: Oct. 10, 1989

[54] AUTOMATIC DATA/VOICE SENDING/RECEIVING MODE SWITCHING DEVICE

[75] Inventor: Yoji Shibata, Yokosuka, Japan

[73] Assignee: Hitachi, Ltd., Tokyo, Japan

[21] Appl. No.: 59,514

[22] Filed: Jun. 8, 1987

[30] Foreign Application Priority Data

Jun. 10, 1986 [JP] Japan .................. 61-132785

[51] Int. Cl.$^4$ .......................... H04M 11/00
[52] U.S. Cl. .................... 379/93; 370/110.1
[58] Field of Search .............. 379/93, 94, 96, 98; 370/58, 67, 110.1

[56] References Cited

U.S. PATENT DOCUMENTS

| | | | |
|---|---|---|---|
| 4,009,342 | 2/1977 | Fahrenschon et al. | 379/93 |
| 4,178,480 | 12/1979 | Carbrey | 379/93 |
| 4,306,116 | 12/1981 | McClure et al. | 379/98 |
| 4,546,212 | 10/1985 | Crowder, Sr. | 379/93 |
| 4,685,123 | 8/1987 | Hsia et al. | 379/93 |
| 4,716,562 | 12/1987 | Carse et al. | 370/110.1 |

FOREIGN PATENT DOCUMENTS

| | | |
|---|---|---|
| 60-254862 | 12/1985 | Japan . |
| 60-254891 | 12/1985 | Japan . |
| 0035056 | 2/1986 | Japan .................. 379/98 |

OTHER PUBLICATIONS

Kitami et al., "INS User–Network Interfaces", Review of the Electrical Communications Laboratories, vol. 33, No. 5, 1985, pp. 767–774.

Primary Examiner—Gerald Brigance
Assistant Examiner—Richard Hjerpe
Attorney, Agent, or Firm—Antonelli, Terry & Wands

[57] ABSTRACT

A terminal device sends/receivers data and voice signals through a low speed circuit to/from another device, while switching automatically data and voice signals. The terminal device comprises a data sender/-receiver, a voice sender/receiver, a modulator/-demodulator, and an automatic mode switch. The automatic mode switch includes a circuit disposed beteen the data sender/receiver and the modulator/demodulator for detecting special data such as flags from received data coming from the modulator/demodulator, a circuit for making a logical product of the output of this detecting circuit and a detection signal of the received carrier and means for separating the voice sender/receiver from the circuit and transmitting a sending request for data sending/receiving use. Further switching over from the voice sending/receiving mode to the data sending/receiving mode is effected by key operations, etc.

16 Claims, 5 Drawing Sheets

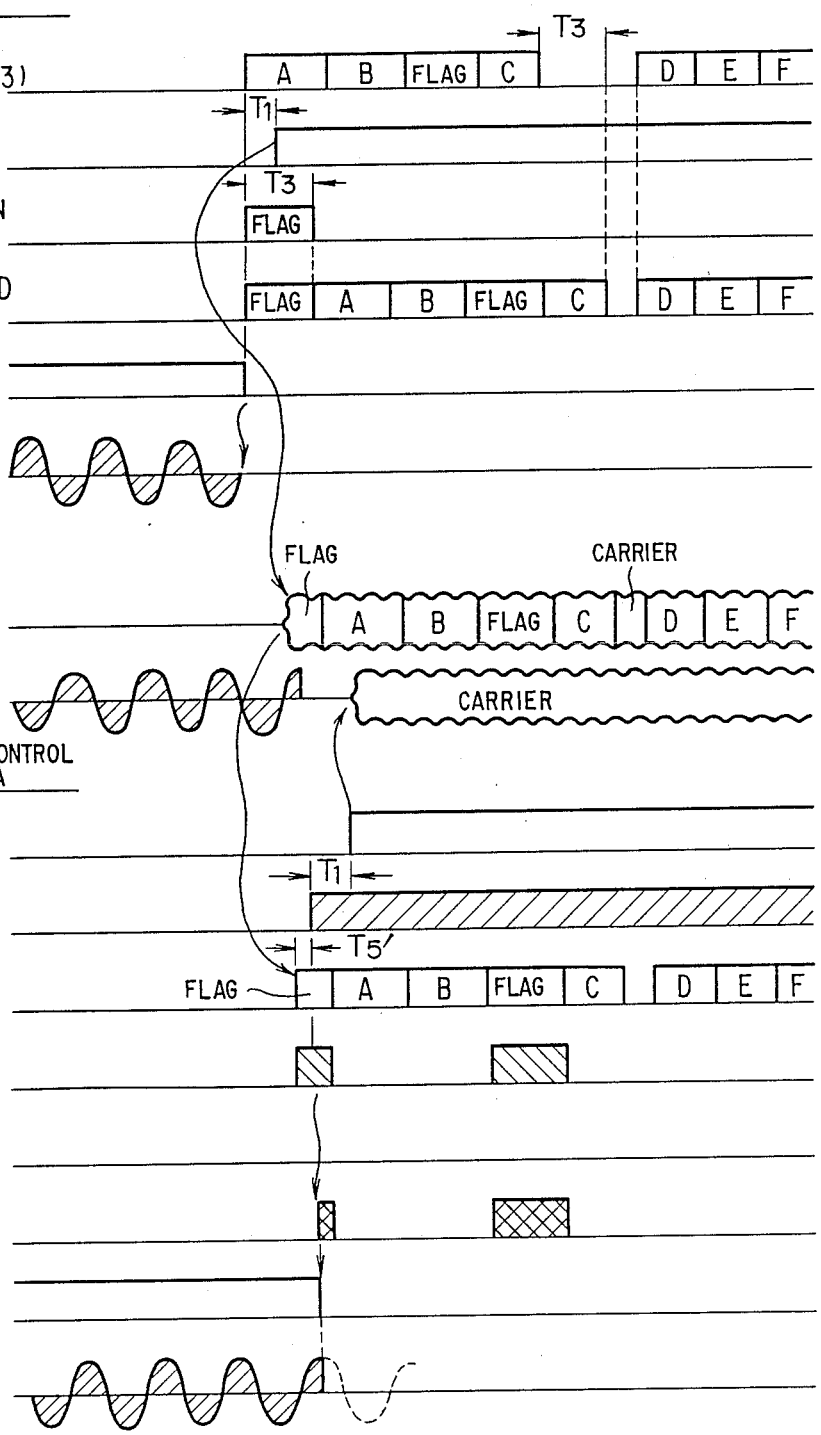

AUTOMATIC DATA/VOICE SENDING/RECEIVING MODE SWITCHING DEVICE

BACKGROUND OF THE INVENTION

1. Field of the Invention

This invention relates to an automatic data/ voice sending/receiving mode switching device used in a terminal device, by means of which data and voice are bidirectionally sent/received between two parties.

2. Description of the Prior Art

Heretofore data communication between two parties using personal computers, etc. as data communication terminal devices is effected by using MODEM (modulator/demodulator), hybrid circuits and a network control circuit through a telephone network.

On the other hand, in the case where not only data but also voice signals are sent/received, a method by which voice is coded and data thus obtained is transmitted is proposed. However this method can only be applied to a high speed circuit such as digital telephone network. That is, since interruptions occur in the reproduction, of the signals when the signals are transmitted at a speed lower than 8 kb/s, this method can be applied to a high speed circuit such as digital telephone network indicated in an article entitled "INS USER-Network Interfaces" Review of the Electrical Communications Laboratories, Vol. 33, No. 5, 1985, p. 767–774.

Consequently, in practice, it is difficult to apply such a voice transmission method to a low speed circuit such as the conventional analogue telephone circuit. It can be conceived to transmit natural voice in real time in an analogue manner, but in the case where natural voice is transmitted in such a manner, it is necessary to send- /receive data and voice while controlling the switching between the two types of signals at each of the terminals.

As a method, by which natural voice is transmitted in real time in an analogue manner, there are known voice/data communication methods published in JP-A 60-254862 and JP-A 60-254891. According. to these methods both voice and data communications are effected by using one telephone line. However a problem exists in that it is necessary to use special commands, push-button (PB) signals, etc. for switching between the voice and data signals and thus such methods lack economy and versatility.

SUMMARY OF THE INVENTION

An object of this invention is to provide an automatic data/voice sending/receiving mode switching device permitting the sending/receiving of data and natural voice without allowing them to interfere with each other at each of terminals, wherein the data and natural voice is sent/received through the same low speed line between the terminals.

Another object of this invention is to provide an economical automatic data/voice sending/receiving mode switching device, which can be added in a simple manner to an existing terminal.

Still another object of this invention is to provide an automatic data/voice sending/receiving mode switching device permitting the switching of data and voice in a simple manner without using any special commands.

The above objects can be achieved by disposing at a terminal detector means for detecting special data sent by another, means for making a logical product of the output of the detector means and received carrier, and switching means for switching from the voice sending/receiving mode to the data sending/receiving mode according to the output of the means for making logical product.

BRIEF DESCRIPTION OF THE DRAWINGS

FIG. 5 is a scheme showing a sequence for control of data sending/receiving control according to this invention.

DESCRIPTION OF THE PREFERRED EMBODIMENTS

Figure 1:
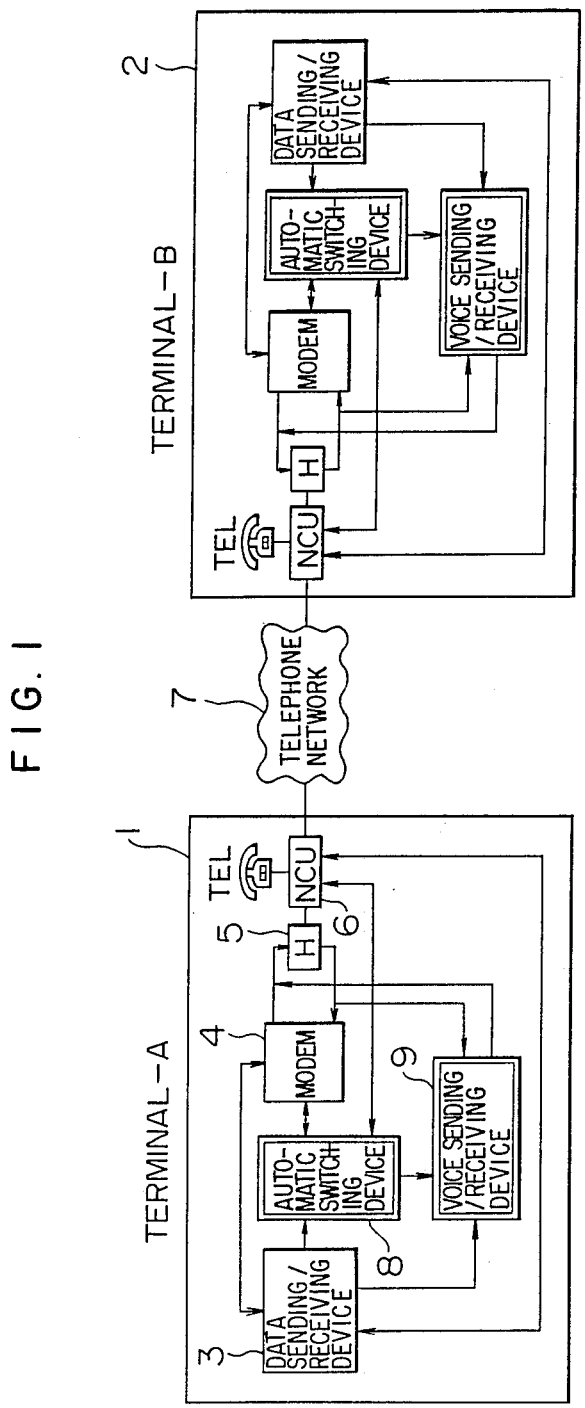
FIG. 1 is a block diagram showing an example of the communication system according to this invention.
Figure 2:
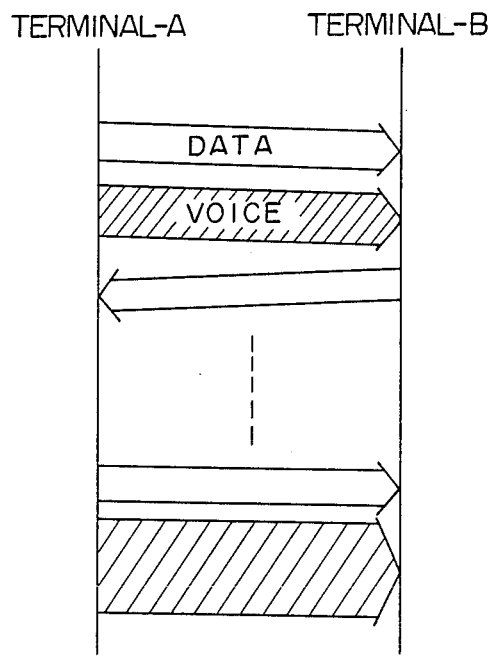
FIG. 2 is a sequence diagram indicating data and voice sending/receiving mode between two terminals in the system shown in FIG. 1.

Hereinbelow this invention will be explained more detail, referring to the drawings.

At first, data communication between two terminals 1 and 2 is possible bidirectionally through a telephone network 7. Here, in each of the terminals 1 and 2, by which natural voice communication is also possible bidirectionally, a voice sending/receiving device 9 is disposed. Further, an automatic mode switching device 8 is disposed for determining whether this voice sending/ receiving device 9 should be connected with the circuit or not. The other devices disposed in the terminals 1 and 2 are those used heretofore and a data sending/receiving device 3 disposed therein is a data communication device such as a personal computer having an interface function, e.g. RS-232-C. A MODEM (modulator/demodulator) 4 connects data signals from a data terminal to an analogue circuit and a DT-206 type modulator/demodulator, a DT-301-23 type modulator/demodulator, etc. based upon V. 24 and V. 28 recommended by CCITT. A hybrid circuit 5 has a 2 line - 4 line transformation function, which connects a 2-line type circuit with a 4-line type circuit. A network control unit (NCU) 6 has a control function of a circuit exchange network such as call emission, restoration, dialing, etc. and a construction to house a telephone TEL therein.

In such a system indicated in FIG. 1 data and voice are sent/received between a terminal (A) 1 and another terminal (B) 2.

Figure 3:
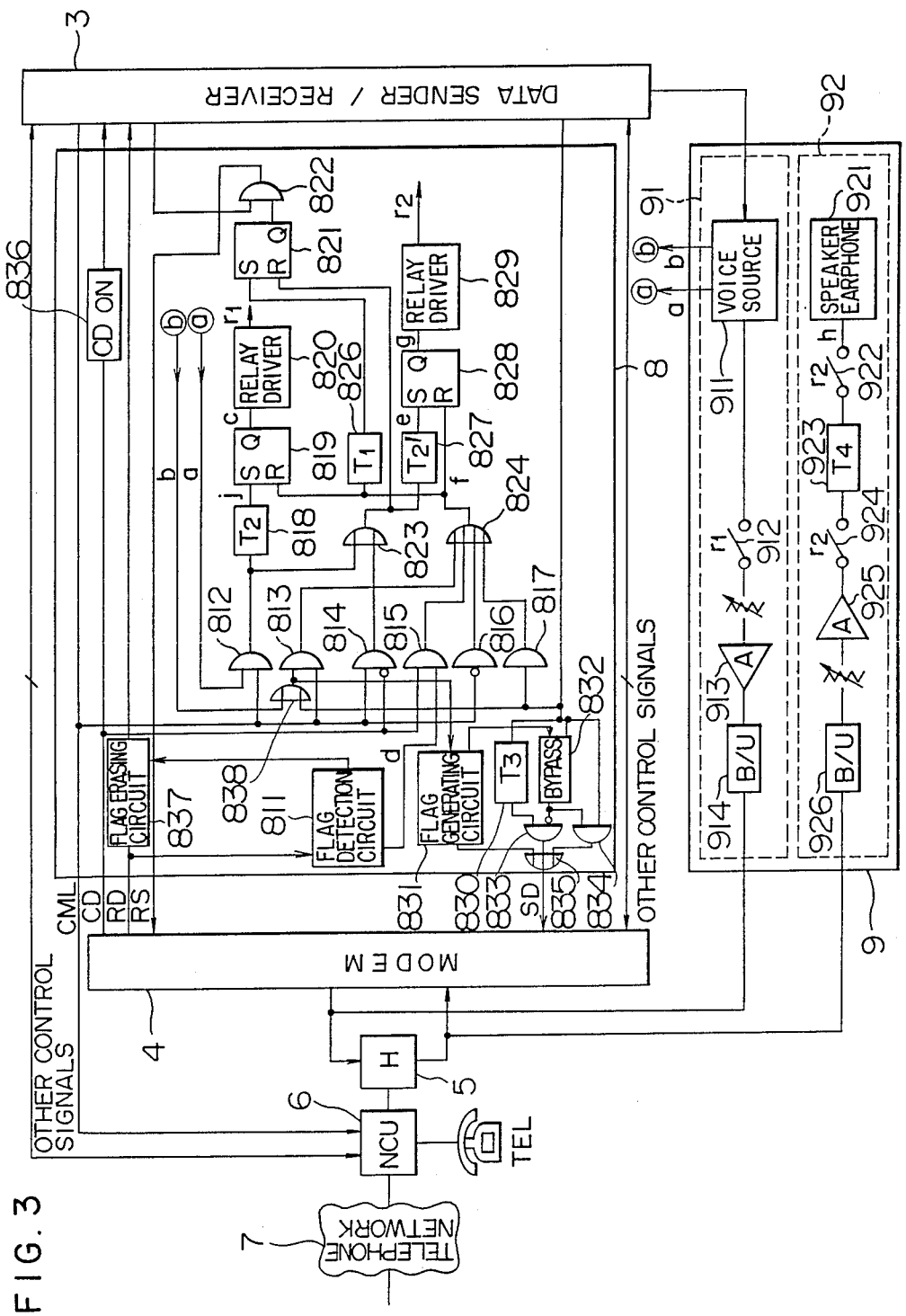
FIG. 3 is a scheme illustrating an embodiment of an automatic switching device according to this invention.

FIG. 3 illustrates a construction of one of the terminals 1 and 2 according to this invention and in particular the circuit construction of an automatic mode switching device 8 and a voice sending/receiving device 9.

The automatic mode switching device 8 is connected between the data sending/receiving device 3 according to the interface standard RS-232-C and the MODEM 4 based on CCITT Recommendations V. 24 and V. 28. This switching device 8 is controlled by using signal lines SD, RD, CD, RS, etc. and principally generates a sending request RS to the MODEM 4. The connection of the circuit to the voice sending/receiving device 9 is controlled there. That is, in the case where an RS flipflop 821 (in which reset has priority, which is valid also for RS flipflops 819 and 828 described later) is set and a sending request is received from the data sending-/receiving device 3, a sending request RS is sent through an AND gate 822 to the MODEM 4, which transmits a carrier. Further, in the case where the RS flipflops 819 and 828 are set, relays R1 and R2 (not shown in the figure) are energized by relay drivers 820 and 829, respectively, so that a voice source 911 (having a microphone, a voice file, a voice starting switch, etc.) of the voice sending section 91 and a speaker, earphone 921, etc. of the voice receiving section 92 are connected with the circuit by their contacts 912 ($r_1$) and 922, 924 ($r_2$) In addition, in FIG. 3, reference numeral 811 represents a flag detection circuit; 818, 826, 827, 830, 923 are delay circuits; 819, 821, 828 RS flipflops; 820, 829 relay drivers; 913, 925 amplifiers; and 914, 926 balance/ unbalance transformation circuits. Further, reference numeral 831 represents a flag generating circuit, 832 a bypass circuit for a delay circuit ($T_3$) 830, 836 a CD ON circuit, which turns on a carrier detect signal CD and 837 a flag erasing circuit.

Hereinbelow a method for announcing previously the start of data transmission from a terminal of the other party will be explained, before this invention is described. When this announcement is received, the mode is switched to the data sending/receiving. In this case, if this announcement is effected only by detecting MODEM carrier, it is feared that it is detected erroneously. This is because, if a frequency component of a voice signal is in accordance with the frequency of the MODEM carrier during voice reception and moreover it continues for a certain period of time, it is detected erroneously as an announcement of the start of data transmission. Consequently, according to this invention, special data are included in data to be received and the announcement for the start of data transmission is detected, only when the special data is also detected. For example, in the start-stop synchronization system STX, etc., in the SYN synchronization system SYN synchronization signal, etc. and in the flag synchronization system flags, etc. can be used as the special data.

Figure 4:
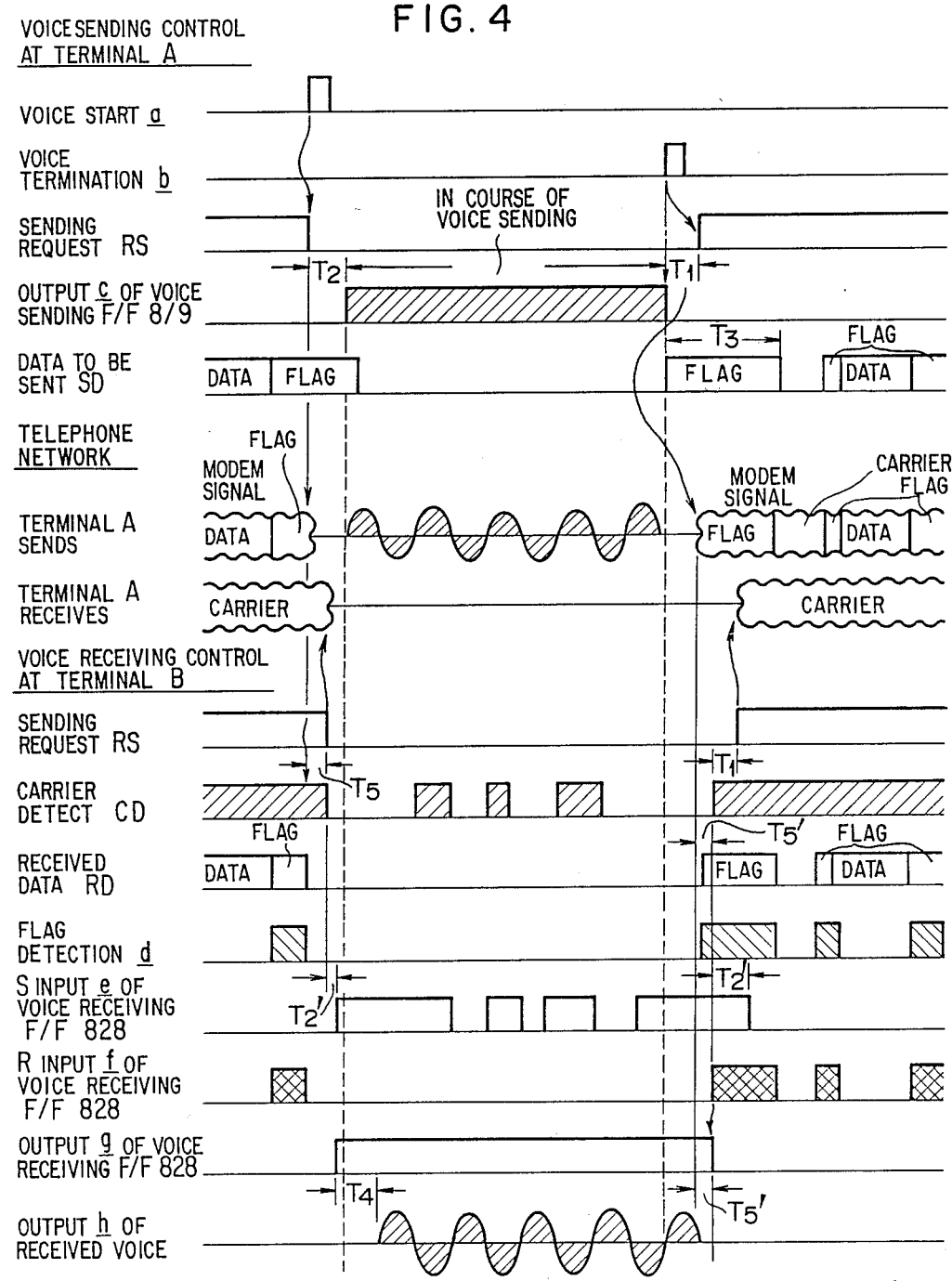
FIG. 4 is a scheme showing a sequence for control of voice sending/receiving according to this invention.

Now this invention will be explained, referring to the control sequence indicated in FIGS. 4 and 5, by taking as an example the case where data is transmitted by the flag synchronization system and the special data for the announcement for the start of data transmission are flags.

A case where a terminal (A) 1 has terminated a data sending and proceeds to a voice sending will be explained, by referring to FIG. 4. When the terminal (A) 1 shifts from data sending to voice sending, a voice starting signal a is outputted from the voice source 911 by operating a key board or additional electric keys. A logical product of this voice starting signal a and a circuit connection instruction CML is formed in an AND gate 812. Then the RS flipflop 819 for the voice sending is set through the delay circuit 818 and on the other hand the RS flipflop 821 is reset through the OR gate 823. In other words, at the terminal 1 the sending request RS is immediately stopped by the voice starting signal a. However, after a period of time $T_2$ the voice sending section 91 consisting of the voice source 911, the relay contact 912, the amplifier 913, balance/ unbalance transformation circuit 914, etc. is connected with the circuit by an operation of the relay driver 820 and voice signals are outputted to the circuit instead of MODEM signals, which have been outputted up to that time. In this way the terminal 1 is set in the voice sending mode. In this case the voice starting signal a through the OR gate 823 sets also the RS flipflop 828 for the voice reception through the delay circuit 827. In this way the voice receiving section 92 is connected with the circuit by an operation of the relay driver 829 and as a result the terminal 1 is set in the voice sending/receiving mode.

Moreover, here the voice source 911 may be constructed by a usual microphone and a voice starting/ ending change over switch. It may also be possible to transmit a desired message by storing the message, etc. in a magnetic disc, etc., reading it out according to a control signal coming from the data sending/receiving device 3 and switching over to the voice sending mode. At this time, in the case where a personal computer, etc. are used as the data sending/receiving device 3, it is possible to incorporate this function in the personal computer, etc.

On the other hand, at the terminal (B) 2, the MODEM carrier coming from the terminal 1 is always observed. In the case where a carrier detect signal CD representing a carrier interruption is obtained as a result, it is detected by the AND gate 814 and in addition the RS flipflop 821 is reset through the OR gate 823, which stops the sending request RS. At the same time the RS flipflop 828 for the voice reception is set through the delay circuit 827 and the relay driver 829 is driven. In other words, at the time, when a carrier detection signal CD representing a carrier interruption is obtained, the sending request RS is stopped. After a period of time $T_2'$ measured from that time, which is necessary for being set in a state where the voice reception is possible, has lapsed, the relay $r_2$ is operated by the relay device 829 and the voice receiving section 92 consisting of the balance/unbalance transformation circuit 926, the amplifier 925, the relay contacts 922 and 924, the delay circuit 923, the speaker 921, etc. is connected with the circuit. As a result, the terminal 2 is set in the voice receiving mode. In this case, it is possible to receive the voice signal to be received at the terminal 2 surely from its beginning portion, when the time relation is set so that $T_2 \geq T_5 + T_2'$, in which $T_5$ represents the necessary period of time from the time when the carrier from the terminal 1 is really interrupted to the time when it is detected. Further, in this state, since the terminals A and B are connected with a communication line, a CD ON signal is sent to the data sending/receiving device 3 by a CD ON circuit 836.

Now, in such a state, when the voice sending from the terminal (A) 1 is terminated, the terminal 1 outputs a voice termination signal b from the data sending-/receiving device 3 by operating the key board or the keys, etc. This signal b resets the RS flipflops 819 and 828 for the voice sending and the voice reception through the AND gate 813 and the OR gate 824 and moreover sets the RS flipflop 821 after having been delayed by a period of time $T_1$ by the delay circuit 826. In this way the terminal 1 is set in the data sending-/receiving mode, where a sending request RS is transmitted by the fact that the RS flipflop 821 is set and thus sending of the MODEM carrier is begun. At this time, a voice termination signal b passes through an OR gate 838 and is inputted in the flag generating circuit 831. Then, a flag is sent to the terminal (B) 2 by the data to be sent SD during a period of time of $T_3$.

On the other hand, at the terminal (B) 2, when the carrier from the terminal 1 is detected by the signal line CD and in addition the flag contained in the carrier is detected through the signal line RD by the flag detection circuit 811, the output of the AND gate 815 resets the RS flipflops 819 and 829 for the voice sending and the voice reception through the OR gate 824. Further, the RS flipflop 821 is set after a period of time $T_1$. In this way, the relay contacts 912, 922 and 924 are opened and the connection of the voice sending/receiving device 9 is turned off. At the same time, a sending request RS is transmitted. It is recognized as an announcement for the start of data sending and the mode is switched from the voice receiving to the data receiving. A problem in this case, is that if no measures are taken, the sound of the MODEM carrier is reproduced from the speaker 921, until the mode is switched to the data sending/receiving. A certain time $T_5'$ is necessary for detecting the carrier and the voice receiving section 92 is still connected with the circuit, until it is detected. The delay circuit 923 disposed in the voice receiving section 92 is inserted for the purpose of preventing this reproduction of the MODEM carrier from the speaker 921. In the case where the delay time is set so as to satisfy a relation $T_5' < T_4 < T_1 + T_5'$, the relay contact 922 is opened, while the MODEM carrier is delayed by the delay circuit 923. That is, if the delay time relation is set as described above and relay contacts 924 and 922 are inserted in the in/output stages of the delay circuit 923, voice signals can be reproduced up to their ending and nevertheless reproduction of sound due to the MODEM carrier is prevented. Further, the flag erasing circuit 837 has a function to erase the data during a period of time $T_3$ after the detection of the flag and to send only the data coming from the terminal (A) 1 to the data sending/receiving device 3.

Finally, the case where the terminal (B) 2 begins a data transmission during a voice transmission of the terminal (A) 1 will be explained. When the terminal (B) 2 interrupts its voice sending mode, a voice termination signal b is outputted by the voice source 911 in the terminal (B) 2 or data, to which a flag is added, are outputted as sending data SD through the OR gate 835. The output of the gate 817 for the sent data detection or the AND gate 813 resets the RS flipflops 819 and 828 for the voice transmission and for the voice reception through the OR gate 824 and sets the RS flipflop 821 after a period of time $T_1$. The terminal (B) 2 sends the sending data SD in the state where it is put in the data sending/receiving mode. In this case the heading of the sending data is necessarily a flag.

This case will be explained, referring to FIGS. 3 and 5. When the data to be sent are outputted by the data sending/receiving device 3, they pass through the OR gate and are inputted to the flag generating circuit 831. If the state just before it is the voice mode, the flag generating circuit 831 generates a flag as the special data during a period of time of $T_3$ after the time when the data are inputted. Since the data to be sent pass through the delay circuit 830, whose delay time is $T_3$, the output of the OR gate 835 is necessarily the flag and the data to be sent. Further, the bypass circuit 832 works, when the data to be sent are interrupted during a period of time longer than $T_3$ measured from time just after the flag generating circuit 831 has been driven, and bypasses the delay circuit 830. After that, this state is kept, until the following voice mode is established.

On the other hand, since the flag has been detected from the received data RD at the terminal (A) 1 and in addition the carrier has been detected by the carrier detect CD, the output of the AND gate 815 resets the RS flipflops 819 and 828 for the voice sending and for the voice receiving, respectively. Further the RS flipflop 826 is set after the period of time $T_1$ and a sending request RS is transmitted. Furthermore, in the case where voice and MODEM signals are mixed, if MODEM signals produce data errors, it is necessary to insert echo cancelers, etc. therein.

As explained above, according to this embodiment, in the case where not only data but also voice are sent/received between different terminals through a low speed circuit, an effect can be obtained that data and voice can be sent/received without any interference therebetween.

In addition, the automatic mode switching device 8 can be disposed in a simple manner between an existing data sending/receiving device 3 and a MODEM 4 and its function can be easily added to the terminals, for which the voice sending/receiving function is necessary, by adding an adapter thereto. In this case, sending data SD, receiving data RD, sending request RS, received carrier detection CD, and circuit connection instruction CML as interface RS-232-C defined in V. 24, V. 28, etc. of CCCITT Recommendation can be used as they are in order to effect the switching control. In addition, in FIG. 3, for other control signals sent/received between the data sending/receiving device 3 and the MODEM 4 transmission possible CS, data set ready DR, etc. can be utilized. Furthermore, for other control signals sent/received between the data sending/receiving device 3 and the network control unit 6 called indication CI, etc. can be utilized.

Further, in this automatic mode switching device 8, it is possible to economically prevent erroneous operation by switching it to the data sending/receiving mode, when the carrier from the other terminal is detected and a flag contained in the carrier is detected. That is, in the start-stop synchronization system STX, etc. of the start bit, in the character synchronization system SYN synchronization, etc. such as "01101101", and in the flag synchronization system flag pattern, etc. such as "01111110" can be used as special data. In addition, when an interruption of the carrier from the other terminal, since the mode is automatically switched to voice receiving, it is not necessary to send/receive any special command between the terminals and therefore the control is easy. Moreover an advantage can be obtained in that the voice/data switching is effected at an arbitrary time.

Further, although the above explanation has been made for the case where a flag pattern is added to the data to be sent within the automatic mode switching device 8 and sent to the MODEM 4 through the sending data line SD, it is also possible to add the flag to the data to be sent at the data sending/receiving device 3. Similarly it is also possible not to remove the flag sent to the receiving data line RD in the automatic mode switching device 8 and to send only the received data to the data sending/receiving device 3 as they are.

I claim:

1. A terminal device which sends/receives data and voice signals through a low speed circuit to/from another device, comprising:
    data sending/receiving means which sends/receives digital data;
    modulation/demodulation means which modulates/demodulates digital data from/to said data sending/receiving means in order to make said digital data conform to said low speed circuit;

voice sending/receiving means which sends/receives voice signals through said low speed circuit; and voice/data switching means connected between said data sending/receiving means and said modulation/demodulation means for switching between data and voice modes wherein said data mode sends/receives data to/from said other device and said voice mode sends/receives voice to/from said other device;

said voice/data switching means including detecting means for detecting a received carrier from said other device through said modulation/demodulation means, means for interrupting said data mode upon detection of an interruption of said received carrier and starting said voice mode, and for connecting said voice sending/receiving means to said low speed circuit, detecting means for detecting special data from said other terminal device through said modulation/demodulation means, means for outputting a logical product of an output from said special data detecting means and an output from said received carrier detecting means, said logical product output being connected to said modulation/demodulation means, and means for setting said data mode according to said logical product output from said logical product means and for disconnecting said voice sending/receiving means from said low speed circuit.

2. A terminal device according to claim 1, wherein said special data detecting means in said voice/data switching means includes a flag synchronization detecting circuit.

3. A terminal device according to claim 1, wherein said voice/data switching means recognizes when a voice sent/received to/from said voice sending/receiving means or data sent/received to/from said data sending/receiving means is terminated or interrupted.

4. A terminal device according to claim 3, wherein said voice/data switching means further comprises:

means for detecting when said data mode is terminated by receipt of a voice actuating signal sent from said voice sending/receiving means; and means for interrupting issuance of a sending request to said modulation/demodulation means and for interrupting sending of a sending carrier.

5. A terminal device according to claim 3, wherein said voice/data switching means further comprises:

means for delaying data to be sent, until it becomes possible for said other terminal device to pull-in the carrier sufficiently and to receive data, when voice reception is interrupted and data is sent from said data sending/receiving means.

6. A terminal device according to claim 1, wherein said voice sending/receiving means comprises:

means for delaying a received voice from a time when said voice/data switching means begins receiving said received carrier to a time when said voice sending/receiving means is disconnected from said low speed circuit.

7. A terminal device according to claim 1, wherein said voice/data switching means further comprises:

a first flipflop for setting a voice sending mode of said voice mode;

a second flipflop for setting a voice receiving mode of said voice mode;

a third flipflop for setting said data mode;

means for putting said first and second flipflops in a set state and at the same time putting said third flipflop in a reset state based on a voice sending request from said terminal device;

means for putting said first and second flipflops in a set state and at the same time putting said third flipflop in said set state based on detection of a carrier interruption from said other terminal device; and means for putting said first and second flipflops in a reset state and at the same time putting said third flipflop in a set state based on receipt of a voice sending termination signal from said terminal device or based on a logical product signal of an output of a detecting means for detecting data sent by said other terminal device and said received carrier.

8. A terminal device according to claim 7, wherein said voice/data switching means includes:

first delaying means for delaying a set input to said first flipflop by a first period of time;

second delaying means for delaying a set input to said second flipflop by a second period of time; and third delaying means for delaying a set input to said third flipflop by a third period of time.

9. A terminal device according to claim 1, wherein said voice/data switching means uses a sending data line, a received data line, a received carrier detection line and a data sending request line among interface connection lines disposed between said data sending/receiving means and said modulation/demodulation means.

10. A terminal device according to claim 1, wherein said data sending/receiving means includes a personal computer having an RS. 232-C interface.

11. A terminal device according to claim 1, wherein said voice sending/receiving means includes a relay contact actuated by a relay driving and control signal from said voice/data switching means in order to perform the disconnection of said voice sending/receiving means from said low speed circuit.

12. A terminal device according to claim 1 wherein said special data detecting means in said voice/data switching means includes a character data detecting circuit for detecting predetermined particular character data sent in stepping synchronization.

13. A terminal device according to claim 1, wherein said special data detecting means in said voice/data switching means includes a SYN synchronization detecting circuit.

14. A terminal device according to claim 1, wherein said voice/data switching means includes sending means for sending said special data by deleting a whole or a part thereof to said data sending/receiving means after detecting said special data.

15. A terminal device according to claim 1, wherein said voice/data switching means further comprises:

means for detecting when said voice mode is terminated or interrupted by detecting data sent from said data sending/receiving means, means for issuing a sending request to said modulation/demodulation means, and means for issuing said special data when said termination or interruption detecting means detects termination or interruption of said voice mode.

16. A terminal device according to claim 1, wherein said voice/data switching means further comprises:

means for detecting when said voice mode is terminated by receipt of a voice termination signal sent from said data sending/receiving means, means for issuing a sending request to said modulation/demodulation means, and means for issuing the special data when said termination detecting means detects termination of said voice mode.

* * * * *